(12) United States Patent
Kurota

(10) Patent No.: US 12,167,181 B2
(45) Date of Patent: Dec. 10, 2024

(54) SPECIFYING METHOD, SPECIFYING SYSTEM WHICH ACCURATELY SPECIFIES THE CORRESPONDENCE RELATION BETWEEN THE PROJECTOR COORDINATE SYSTEM AND THE CAMERA COORDINATE SYSTEM

(71) Applicant: SEIKO EPSON CORPORATION, Tokyo (JP)

(72) Inventor: Ippei Kurota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 552 days.

(21) Appl. No.: 17/507,883

(22) Filed: Oct. 22, 2021

(65) Prior Publication Data

US 2022/0132088 A1 Apr. 28, 2022

(30) Foreign Application Priority Data

Oct. 23, 2020 (JP) ................................ 2020-178205

(51) Int. Cl.
*H04N 9/31* (2006.01)
*G01B 11/25* (2006.01)
(Continued)

(52) U.S. Cl.
CPC ....... *H04N 9/3194* (2013.01); *G01B 11/2513* (2013.01); *G06T 7/74* (2017.01); *H04N 9/3188* (2013.01); *H04N 23/6812* (2023.01)

(58) Field of Classification Search
CPC .. H04N 9/3185; H04N 9/3194; H04N 9/3147; G03B 21/147; G03B 21/14; G03B 21/142; G03B 21/26
See application file for complete search history.

(56) References Cited

U.S. PATENT DOCUMENTS 10,057,554 B2 * 8/2018 Narikawa ............ H04N 9/3182
10,921,701 B2 * 2/2021 Suzuki ................. H04N 9/3194
(Continued)

FOREIGN PATENT DOCUMENTS

JP 2000-352761 12/2000
JP 2015-166893 9/2015
(Continued)

*Primary Examiner* — Ahmed A Berhan
*Assistant Examiner* — Fayez A Bhuiyan
(74) *Attorney, Agent, or Firm* — Dority & Manning, P.A.

(57) ABSTRACT

There is provided a specifying method including, determining whether an camera, that images a projection object onto which a projection image is projected from a projector, is fixed, sequentially projecting images belonging to a first group onto the projection object from the projector when determining that the camera is not fixed, sequentially projecting images belonging to a second group onto the projection object from the projector when determining that the camera is fixed, imaging the projection object with the camera to generate a captured mage in a state in which the images belonging to the first group or the images belonging to the second group are projected, and specifying, based on an image projected onto the projection object from the projector and the captured image by the camera, a correspondence relation between a position on the image projected onto the projection object and a position on the captured image.

10 Claims, 6 Drawing Sheets

(51) Int. Cl.
*G06T 7/73* (2017.01)
*H04N 23/68* (2023.01)

(56) References Cited

U.S. PATENT DOCUMENTS

| | | | |
|---|---|---|---|
| 2011/0216051 A1* | 9/2011 | Ishiyama | G03B 21/00 |
| | | | 345/207 |
| 2015/0015852 A1 | 1/2015 | Furui | |
| 2015/0348313 A1* | 12/2015 | Fuchikami | H04N 23/60 |
| | | | 348/333.01 |
| 2018/0184058 A1 | 6/2018 | Narikawa et al. | |
| 2019/0297306 A1 | 9/2019 | Narikawa | |
| 2020/0099906 A1* | 3/2020 | Sugisawa | H04N 9/3185 |

FOREIGN PATENT DOCUMENTS

| | | |
|---|---|---|
| JP | 2016-139156 | 8/2016 |
| JP | 2018-101968 | 6/2018 |
| JP | 2019-168546 | 10/2019 |

* cited by examiner

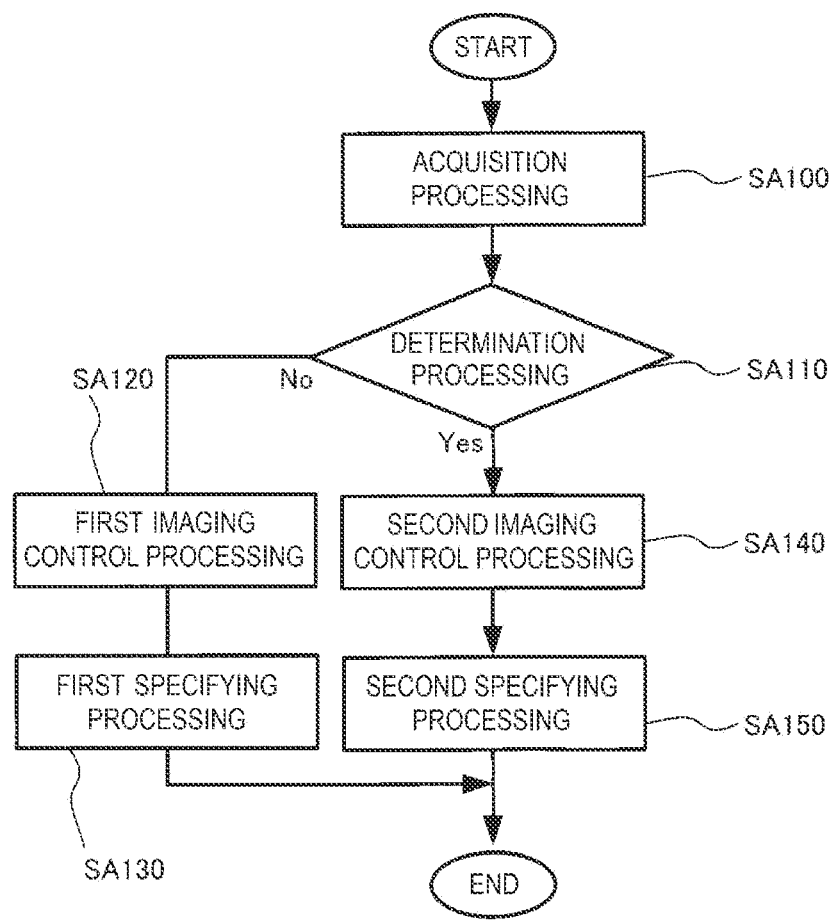

SPECIFYING METHOD, SPECIFYING SYSTEM WHICH ACCURATELY SPECIFIES THE CORRESPONDENCE RELATION BETWEEN THE PROJECTOR COORDINATE SYSTEM AND THE CAMERA COORDINATE SYSTEM

The present application is based on, and claims priority from JP Application Serial Number 2020-178205, filed Oct. 23, 2020, the disclosure of which is hereby incorporated by reference herein in its entirety.

BACKGROUND

1. Technical Field

The present disclosure relates to a specifying method, a specifying system, and a program.

2. Related Art

In projection mapping, a projection image is sometimes projected onto a nonplanar screen from a projector. The projection image projected onto the nonplanar screen is seen distorted for a user according to the shape of the screen. Therefore, when a projection destination of the projection image is the nonplanar screen, normally, the projection image is corrected in advance considering the distortion corresponding to the shape of the screen. Examples of a technique for detecting the distortion corresponding to the shape of the screen include a technique disclosed in JP-A-2015-166893 (Patent Literature 1).

In the technique disclosed in Patent Literature 1, first, a projection direction of a projector with respect to a screen is specified. In the technique disclosed in Patent Literature 1, a pattern image applied with deformation corresponding to the specified projection direction is projected onto the screen from the projector. In the technique disclosed in Patent Literature 1, the screen is imaged by a camera in a state in which the pattern image applied with the deformation is projected. In the technique disclosed in Patent Literature 1, a correspondence relation between a projector coordinate system and a camera coordinate system is specified based on the pattern image applied with the deformation corresponding to the projection direction and a captured image of the camera. The projector coordinate system is a coordinate system indicating a position in the projection image. The camera coordinate system is a coordinate system indicating a position in the captured image by the camera. In the technique disclosed in Patent Literature 1, distortion corresponding to the shape of the screen is detected based on the correspondence relation between the projector coordinate system and the camera coordinate system.

Simply by considering the projection direction of the projector with respect to the screen, the correspondence relation between the projector coordinate system and the camera coordinate system sometimes cannot be specified at sufficient accuracy. When the user images the screen with a camera held by hand, the correspondence relation between the projector coordinate system and the camera coordinate system cannot be specified at sufficient accuracy because of the influence of a camera shake or the like.

SUMMARY

A specifying method according to an aspect of the present disclosure includes: determining whether an imaging device that images a projection object onto which a projection image is projected from a projector is fixed; sequentially projecting images belonging to a first group onto the projection object from the projector when determining that the imaging device is not fixed and sequentially projecting images belonging to a second group onto the projection object from the projector when determining that the imaging device is fixed; imaging the projection object with the imaging device to generate a captured image in a state in which the images belonging to the first group or the images belonging to the second group are projected; and specifying, based on an image projected onto the projection object from the projector and the captured image by the imaging device, a correspondence relation between a position on the image projected onto the projection object and a position on the captured image.

A specifying system according to an aspect of the present disclosure includes: a projector; an imaging device; and a processing device. The processing device executes: determining whether the imaging device is fixed; causing the projector to sequentially project images belonging to a first group onto a projection object when determining that the imaging device is not fixed and causing the projector to sequentially project images belonging to a second group onto the projection object when determining that the imaging device is fixed; causing the imaging device to image the projection object to generate a captured image in a state in which the images belonging to the first group or the images belonging to the second group are projected; and specifying, based on an image projected onto the projection object from the projector and the captured image by the imaging device, a correspondence relation between a position on the image projected onto the projection object and a position on the captured image.

A non-transitory computer-readable storage medium according to an aspect of the present disclosure stores a program, the program causing a computer to execute: determining whether an imaging device that images a projection object onto which a projection image is projected from a projector is fixed; causing the projector to sequentially project images belonging to a first group onto the projection object when determining that the imaging device is not fixed and causing the projector to sequentially project images belonging to a second group onto the projection object when determining that the imaging device is fixed; causing the imaging device to image the projection object to generate a captured image in a state in which the images belonging to the first group or the images belonging to the second group are projected; and specifying, based on an image projected onto the projection object from the projector and the captured image by the imaging device, a correspondence relation between a position on the image projected onto the projection object and a position on the captured image.

BRIEF DESCRIPTION OF THE DRAWINGS

FIG. 6 is flowchart showing a flow of a specifying method that a processing device of the specifying device executes according to a program.

DESCRIPTION OF EXEMPLARY EMBODIMENTS

An embodiment of the present disclosure is explained below with reference to the drawings. Technically preferred various limitations are added to the embodiment explained below. However, embodiments of the present disclosure are not limited to the embodiment explained below.

1. Embodiment

Figure 1:
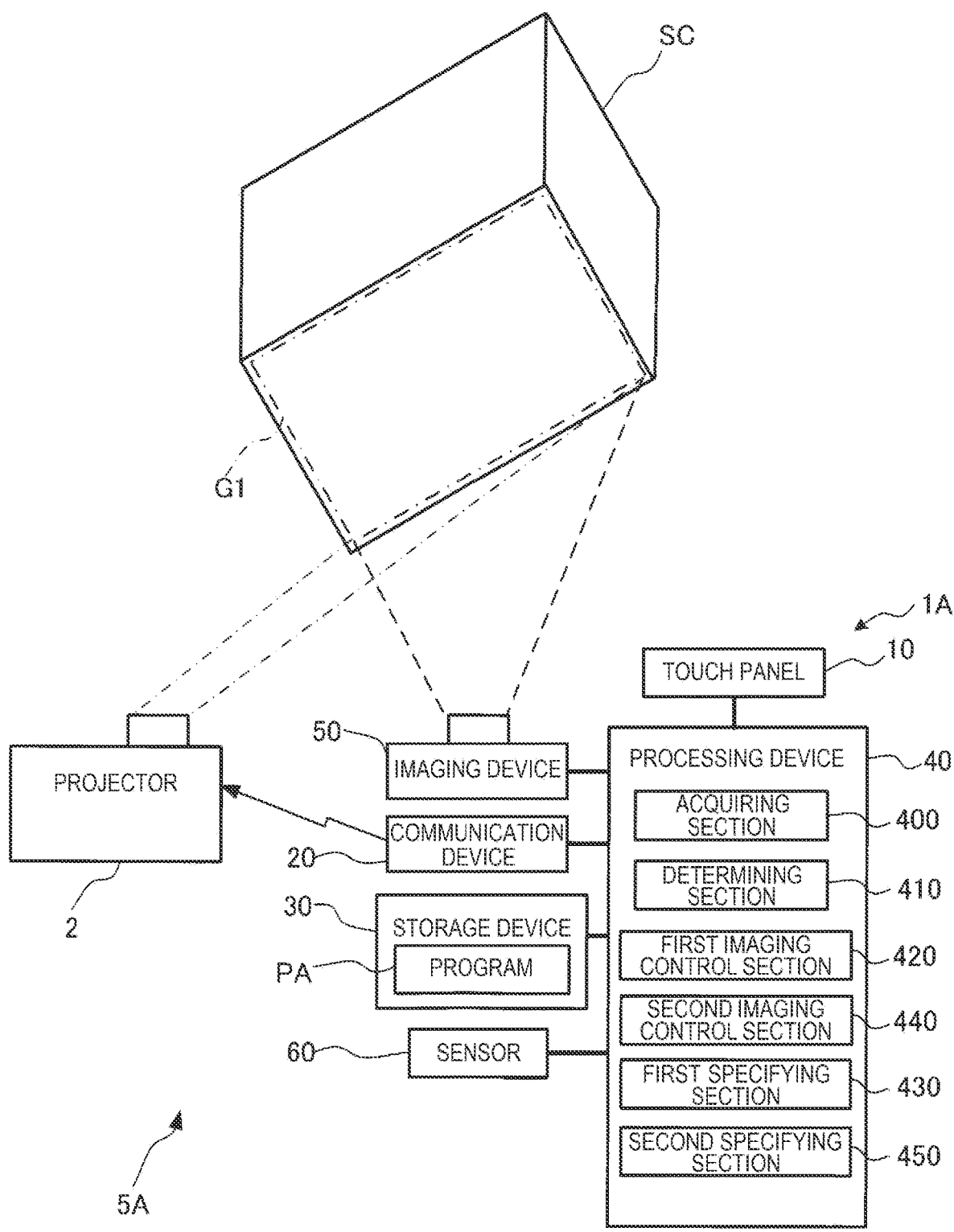
FIG. 1 is a block diagram showing a configuration example of an image display system including a specifying device that executes a specifying method according to an embodiment of the present disclosure.

FIG. 1 is a block diagram showing a configuration example of an image display system 5A including a specifying device 1A according to an embodiment of the present disclosure. The image display system 5A includes, besides the specifying device 1A, a projector 2 that communicates with the specifying device 1A. The projector 2 projects, onto the surface of a projection object SC, a projection image G1 corresponding to image data supplied from the specifying device 1A. In FIG. 1, although detailed illustration is omitted, the projector 2 includes a light source, three display panels functioning as a light modulating device, a projection lens, and a display-panel driving section.

The three display panels in the projector 2 respectively correspond to colors of red, green, and blue. In this embodiment, the display panels are liquid crystal light valves. The display-panel driving section controls light transmittance in each of the three display panels according to the image data supplied from the specifying device 1A. The projector 2 modulates light emitted from the light source in each of the three display panels to form image light and projects the image light from the projection lens to display the projection image G1 on the surface of the projection object SC. The projection object SC in this embodiment is a rectangular parallelepiped as shown in FIG. 1 but may have a three-dimensional shape formed by joining polygons such as a trigonal pyramid or a square pyramid or a three-dimensional shape having a curved surface.

The specifying device 1A is, for example, a smartphone. The specifying device 1A has an imaging function and a communication function for communicating with the projector 2. When the specifying device 1A and the projector 2 are network-connected, the specifying device 1A communicates with the projector 2 and acquires projector information from the projector 2. The projector information includes resolution information and compression scheme information indicating a compression scheme capable of performing decoding in the projector 2.

The resolution information is information indicating the resolution of the display panels in the projector 2. The resolution information is used when a pattern image of a measurement pattern for specifying a correspondence relation between a projector coordinate system and a camera coordinate system is generated. The projector coordinate system a coordinate system indicating a position on a projection image by the projector 2. Examples of the projector coordinate system include a two-dimensional coordinate system having an upper left corner of the projection image as the origin. The camera coordinate system is a coordinate system indicating a position on a captured image. Specific examples of the camera coordinate system include a two-dimensional coordinate system having an upper left corner of the captured image as the origin. As explained in detail below, in this embodiment, a binary code pattern is used as the measurement pattern. The compression scheme information is used for determination of a compression scheme measurement pattern data indicating the measurement pattern when the measurement pattern data is compressed and transmitted from the specifying device 1A to the projector 2. The compression scheme in compressing the measurement pattern data and transmitting the measurement pattern data from the specifying device 1A to the projector 2 is desirably reversible compression schemes such as run length, LZH, PNG, and GIF.

The specifying device 1A generates, using the resolution information acquired from the projector 2, measurement pattern data representing each of a plurality of measurement patterns and gives the generated measurement pattern data to the projector 2. The projector 2 projects, onto the projection object SC, an image of each of the plurality of measurement patterns indicated by the measurement pattern data given from the specifying device 1A. The specifying device 1A may transmit a command to the projector 2. The projector 2 may generate the measurement pattern data based on the command. When the command is transmitted from the specifying device 1A to the projector 2, it is unnecessary to include the compression scheme information in the projector information. In an aspect in which the projector 2 generates the measurement pattern data, a communication time for transmitting the measurement patterns from the specifying device 1A to the projector 2 is reduced.

The specifying device 1A urges the user to image, for each of the measurement patterns, the projection object SC onto which a pattern image of the measurement pattern is projected by the projector 2. The specifying device 1A images, according to operation by the user, with the imaging function, the projection object SC onto which the pattern image of the measurement pattern is projected. When the projection object SC onto which the pattern image of the measurement pattern is projected is imaged using the specifying device 1A, the specifying device 1A is fixed using a tripod or the like to image the projection object SC in some cases and the user holds the specifying device 1A by hand to image the projection object SC, that is, the specifying device 1A is not fixed in other cases. The specifying device 1A specifies the correspondence relation between the projector coordinate system and the camera coordinate system from a plurality of captured images and a plurality of pattern images. Specifying the correspondence relation between the projector coordinate system and the camera coordinate system means generating a transformation matrix for projective transformation from one coordinate system to the other coordinate system.

As shown in FIG. 1, the specifying device 1A includes a touch panel 10, a communication device 20, a storage device 30, a processing device 40, an imaging device 50, and a sensor 60. The communication device 20 is a wireless communication module or a wired communication module. When the communication device 20 is the wired communication module, the communication device 20 is connected to the projector 2 via a communication line. Connection of the specifying device 1A and the projector 2 may be direct connection not via a relay device such as a router or may be indirect connection via the relay device. When the communication device 20 is the wireless communication module, specific examples of the direct connection include ad-hoc connection and specific examples of the indirect connection include access point connection via a wireless access point device. When the communication device 20 is the wired communication module, specific examples of the direct connection include peer-to-peer connection and specific examples of the indirect connection include connection via a wired router or a wired hub. The communication device 20 communicates with the projector 2 under control by the processing device 40. The imaging device 50 is a camera. The imaging device 50 performs imaging under the control by the processing device 40 and supplies image data representing a captured image to the processing device 40. In this embodiment, the imaging device 50 is fixed to the specifying device 1A.

The touch panel 10 is a device obtained by integrating a display device and an input device. The input device is, for example, a transparent sheet-like contact sensor. The input device is provided to cover a display surface of the display device. The input device detects a touch position using capacitance specified by an object in contact with the input device and the input device and outputs data indicating the detected touch position to the processing device 40. Consequently, operation content of the user on the touch panel 10 is transmitted to the processing device 40.

The sensor 60 is, for example, an acceleration sensor. The sensor 60 detects, under the control by the processing device 40, acceleration of a translational motion of the specifying device 1A corresponding to an external force applied to a housing of the specifying device 1A and outputs acceleration data indicating the magnitude of the detected acceleration to the processing device 40. In this embodiment, since the imaging device 50 is fixed to the specifying device 1A, the acceleration of the specifying device 1A detected by the sensor 60 is acceleration of the imaging device 50 as well.

The storage device 30 is a recording medium readable by the processing device 40. The storage device 30 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Random Access Memory).

In the nonvolatile memory of the storage device 30, a program PA to be executed by the processing device 40 is stored. The volatile memory of the storage device 30 is used by the processing device 40 as a work area in executing the program PA. The program PA can be called "application program", "application software", or application as well. The program PA is acquired from, for example, a not-shown server via the communication device 20. Thereafter, the program PA is stored in the storage device 30. The program PA may be stored in the storage device 30 in advance.

The processing device 40 includes a processor such as a CPU (Central Processing Unit), that is, a computer. The processing device 40 may be configured by a single computer or may be configured by a plurality of computers. According to operation for instructing an execution start of the program PA performed on the touch panel 10, the processing device 40 reads out the program PA from the nonvolatile memory to the volatile memory and starts execution of the program PA. The processing device 40 operating according to the program PA functions as an acquiring section 400, a determining section 410, a first imaging control section 420, a first specifying section 430, second imaging control section 440, and a second specifying section 450 shown in FIG. 1. The acquiring section 400, the determining section 410, the first imaging control section 420, the first specifying section 430, the second imaging control section 440, and the second specifying section 450 shown in FIG. 1 are software modules realized by causing the processing device 40 to operate according to the program PA.

The acquiring section 400 acquires projector information according to an instruction to start specifying the correspondence relation by operation on the touch panel 10 under a situation in which the specifying device 1A and the projector 2 are network-connected. The acquiring section 400 acquires, from the sensor 60, acceleration data indicating the magnitude of acceleration at each of time when the projector information is acquired and time after a predetermined time from the time. The time when the projector information is acquired is an example of first time. The time after the predetermined time from the first time is an example of second time. The acceleration at the first time is an example of first acceleration. The acceleration at the second time is an example of second acceleration. The acceleration data representing the magnitude of the first acceleration is an example of first acceleration data. The acceleration data representing the magnitude of the second acceleration is an example of second acceleration data.

The determining section 410 determines, based on the first acceleration data and the second acceleration data, whether the imaging device 50 is fixed with respect to the projection object SC. More specifically, first, the determining section 410 calculates an amount of change of speed of the imaging device 50 in the predetermined time from the first time to the second time. Specifically, the determining section 410 sets a sum of the magnitude of the first acceleration and the magnitude of the second acceleration as the amount of change of the speed of the imaging device 50 in the predetermined time from the first time to the second time. The determining section 410 determines, based on the amount of change of the speed of the imaging device 50, whether the imaging device 50 is fixed. Specifically, when the amount of change of the speed of the imaging device 50 is smaller than a predetermined threshold, the determining section 410 determines that the imaging device 50 is fixed. Conversely, when the amount of change of the speed of the imaging device 50 is equal to or larger than the predetermined threshold, the determining section 410 determines that the imaging device 50 is not fixed.

The first imaging control section 420 generates, based on the projector information, a plurality of images belonging to a first group as pattern images of a first measurement pattern that the first imaging control section 420 causes the projector 2 to project. The first measurement pattern is a measurement pattern for specifying the correspondence relation between the projector coordinate system and the camera coordinate system in a state in which the specifying device 1A is not fixed, that is, the imaging device 50 is not fixed. When the imaging device 50 is not fixed, the correspondence relation between the projector coordinate system and the camera coordinate system is specified by the first imaging control section 420 and the first specifying section 430 explained below. The first imaging control section 420 generates first measurement pattern data representing measurement patterns belonging to the first group from the resolution information included in the projector information. The first imaging control section 420 controls the projector 2 to sequentially project the measurement patterns represented by the first measurement pattern data. The first imaging control section 420 urges the user to image the measurement patterns sequentially projected onto the projection object SC and causes the imaging device 50 to perform imaging according to operation by the user to generate a captured image.

The first specifying section 430 specifies the correspondence relation between the projector coordinate system and the camera coordinate system based on images of the first group and captured images of the projection object SC imaged in a state in which the images of the first group are projected. The first specifying section 430 generates, from images of a plurality of first measurement patterns and a plurality of captured images, a transformation matrix for performing projective transformation from a coordinate of the first measurement pattern in a captured image captured by the imaging device 50 into a coordinate of the first measurement pattern in the display device of the projector 2.

The second imaging control section 440 generates, based on the projector information, a plurality of images belonging to a second group different from the first group as pattern images of a measurement pattern that the second imaging control section 440 causes the projector 2 to project. The second measurement pattern is a measurement pattern for specifying the correspondence relation between the projector coordinate system and the camera coordinate system in a state in which the specifying device 1A is fixed, that is, a state in which the imaging device 50 is fixed. When the imaging device 50 is fixed, the correspondence relation between the projector coordinate system and the camera coordinate system is specified by the second imaging control section 440 and the second specifying section 450 explained below.

The second imaging control section 440 generates second measurement pattern data representing measurement patterns belong to the second group from the resolution information included in the projector information. The second imaging control section 440 controls the projector 2 to sequentially project the measurement patterns represented by the second measurement pattern data. The second imaging control section 440 urges the user to image the measurement patterns sequentially projected onto the projection object SC and causes the imaging device 50 to perform imaging according to operation by the user to generate a captured image. The second specifying section 450 specifies the correspondence relation between the projector coordinate system and the camera coordinate system based on images of the second group and captured images of the projection object SC imaged in a state in which the images of the second group are projected.

As explained above, in this embodiment, the binary code pattern is used as the measurement pattern. That is, the first measurement pattern and the second measurement pattern are common in that the first measurement pattern and the second measurement pattern are binary code pattern. The binary code pattern means an image for representing a coordinate of the display device using a binary code. The binary code is a method of representing, with ON and OFF of a switch, values of digits when any numerical value is represented by a binary number. When the binary code pattern is used as the measurement pattern, an image projected by the projector 2 corresponds to the switch. Images equivalent to the number of digits of a binary number representing a coordinate value are necessary. Separate images are necessary respectively in an X coordinate and a Y coordinate. For example, when the resolution of the display panel of the projector 2, that is, the numbers of pixels in a longitudinal direction and a lateral direction are respectively represented by binary numbers of six digits, six images are necessary to represent the X coordinate and six images are necessary to represent the Y coordinate.

When the binary code pattern is used as the measurement pattern, it is generally known that robustness of measurement is deteriorated by the influence of disturbance light such as illumination. Accordingly, when the binary code pattern is used as the measurement pattern, in general, a complementary pattern is concurrently used in order to suppress the influence of the disturbance light and improve the robustness of the measurement. The complementary pattern means an image in which white and black are inverted. In the following explanation, a binary code pattern representing 1 with white and representing 0 with black is referred to as "positive pattern" and a complementary pattern obtained by inverting the positive pattern is referred to as "negative pattern". When the numbers of pixels in the longitudinal direction and the lateral direction indicated by the resolution information are respectively represented by binary numbers of six digits, considering the deterioration in the robustness of the measurement, it is desirable to use twenty-four measurement patterns in total including twelve positive patterns and twelve negative patterns as shown in FIG. 2.

Figure 2:
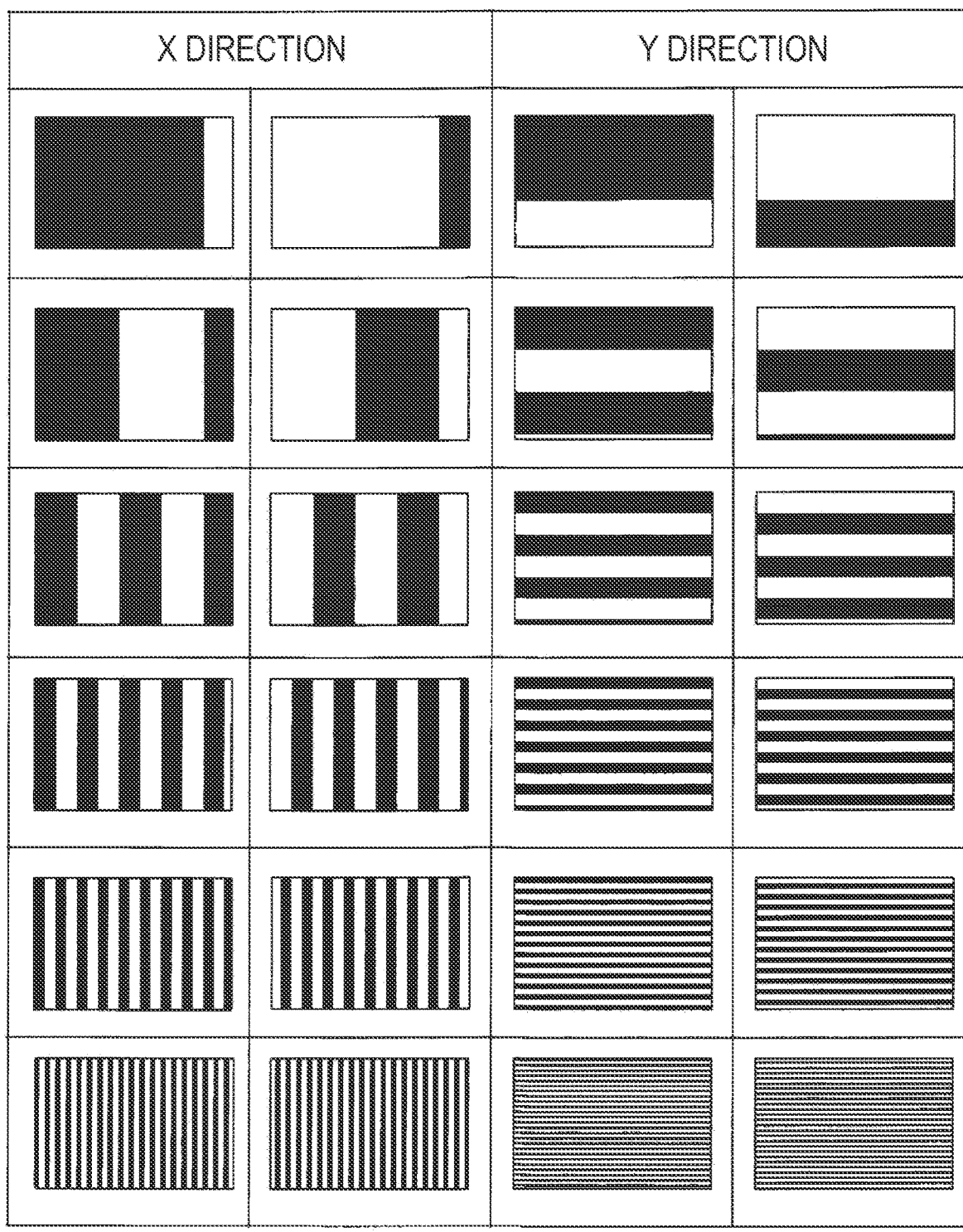
FIG. 2 is a diagram showing an example of a pattern image that the specifying device causes a projector to project.
Figure 3:
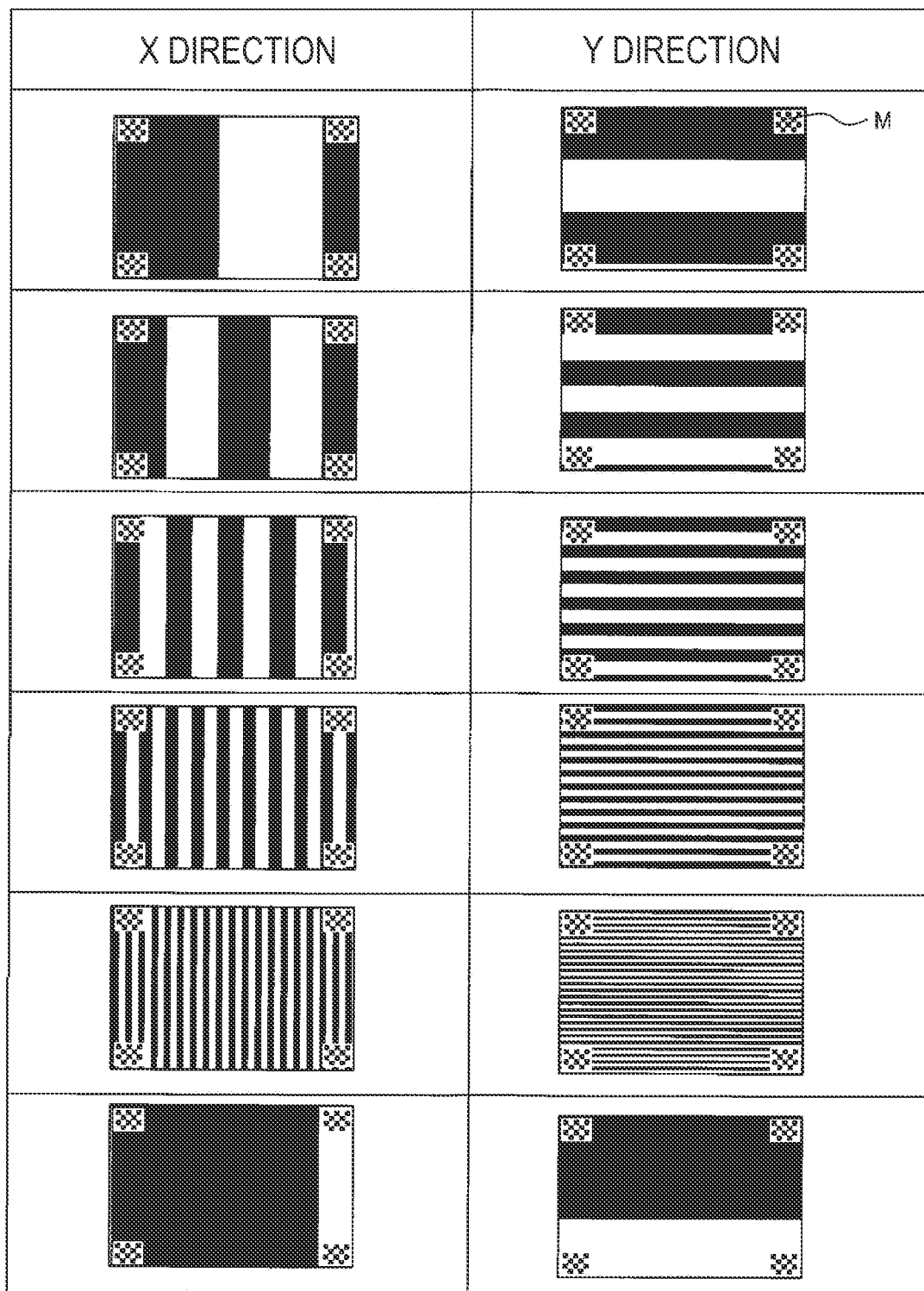
FIG. 3 is a diagram showing an example of a pattern image that the specifying device causes the projector to project.

In this embodiment, when the numbers of pixels in the longitudinal direction and the lateral direction indicated by the resolution information are respectively represented by binary number of six digits, the second imaging control section 440 generates the twenty-four measurement patterns shown in FIG. 2 as the images of the second group. This is to accurately specify the correspondence relation between the projector coordinate system and the camera coordinate system considering the deterioration in the robustness of the measurement. In contrast, the first imaging control section 420 generates the twelve measurement patterns shown in FIG. 3 as the images of the first group. As it is evident when FIG. 3 and FIG. 2 are compared, the first measurement pattern is different from the second measurement pattern in that the first measurement pattern is formed by one of the "positive pattern" and the "negative pattern". That is, in this embodiment, the number of images of the first group is smaller than the number of images of the second group. This is because, in a state in which the imaging device 50 is not fixed, a reduction in the influence of a camera shake is expected by prioritizing quickly finishing specifying the correspondence relation over the improvement of the robustness of the measurement.

As it is evident when FIG. 3 and FIG. 2 are compared, the images of the first group are different from the images of the second group in that the images of the first group have, at four corners, markers M for aligning the images with one another. The first specifying section 430 applies projective transformation to captured images captured by the imaging device 50 such that sets of the four markers M in the captured images overlap one another. The first specifying section 430 specifies the correspondence relation between the projector coordinate system and the camera coordinate system based on the images of the first group and the captured images subjected to the projective transformation. This is because the influence of a camera shake is reduced by applying the projective transformation to the captured images such that the sets of the four markers M overlap one another.

Figure 4:
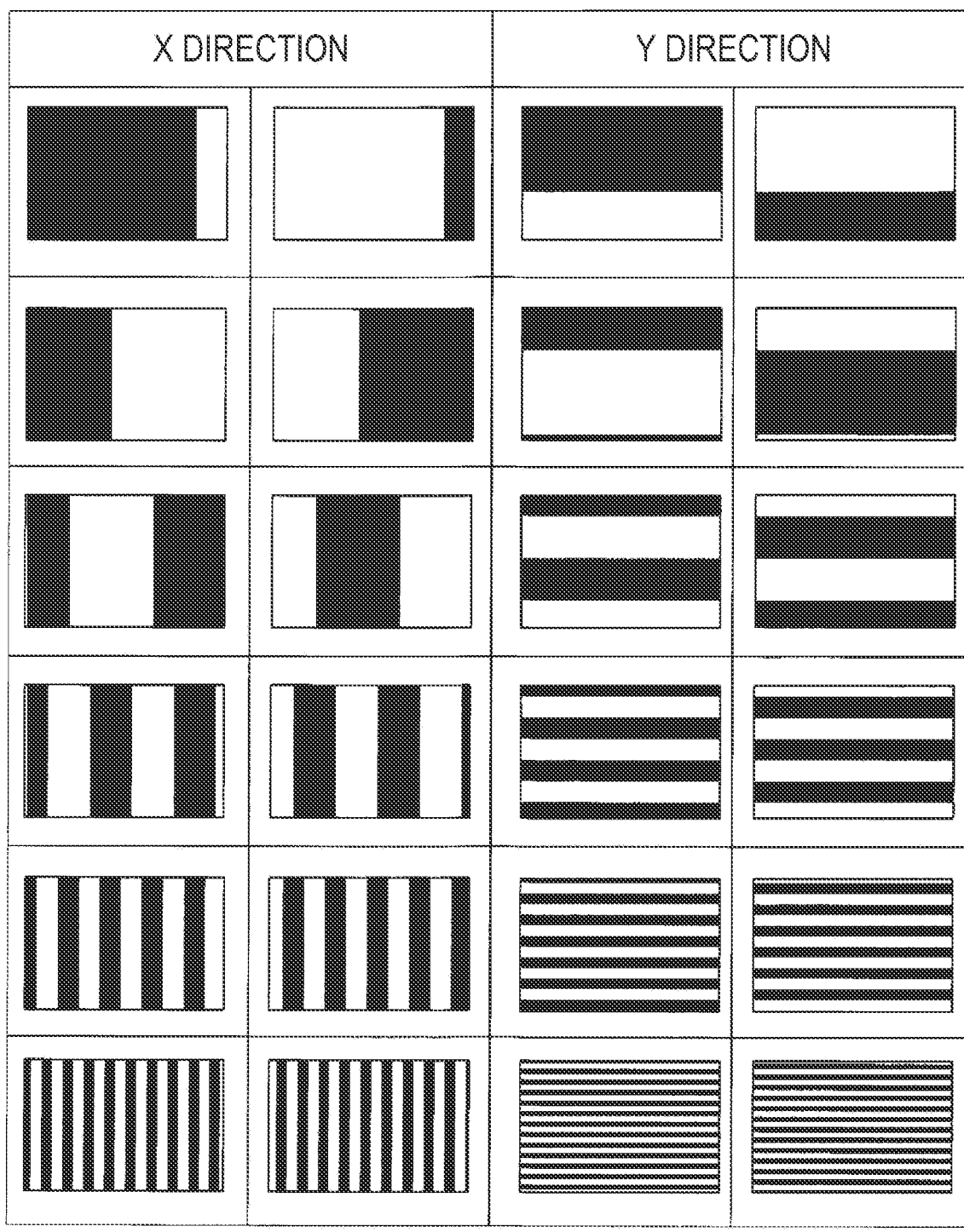
FIG. 4 is a diagram showing an example of a pattern image that the specifying device causes the projector to project.
Figure 5:
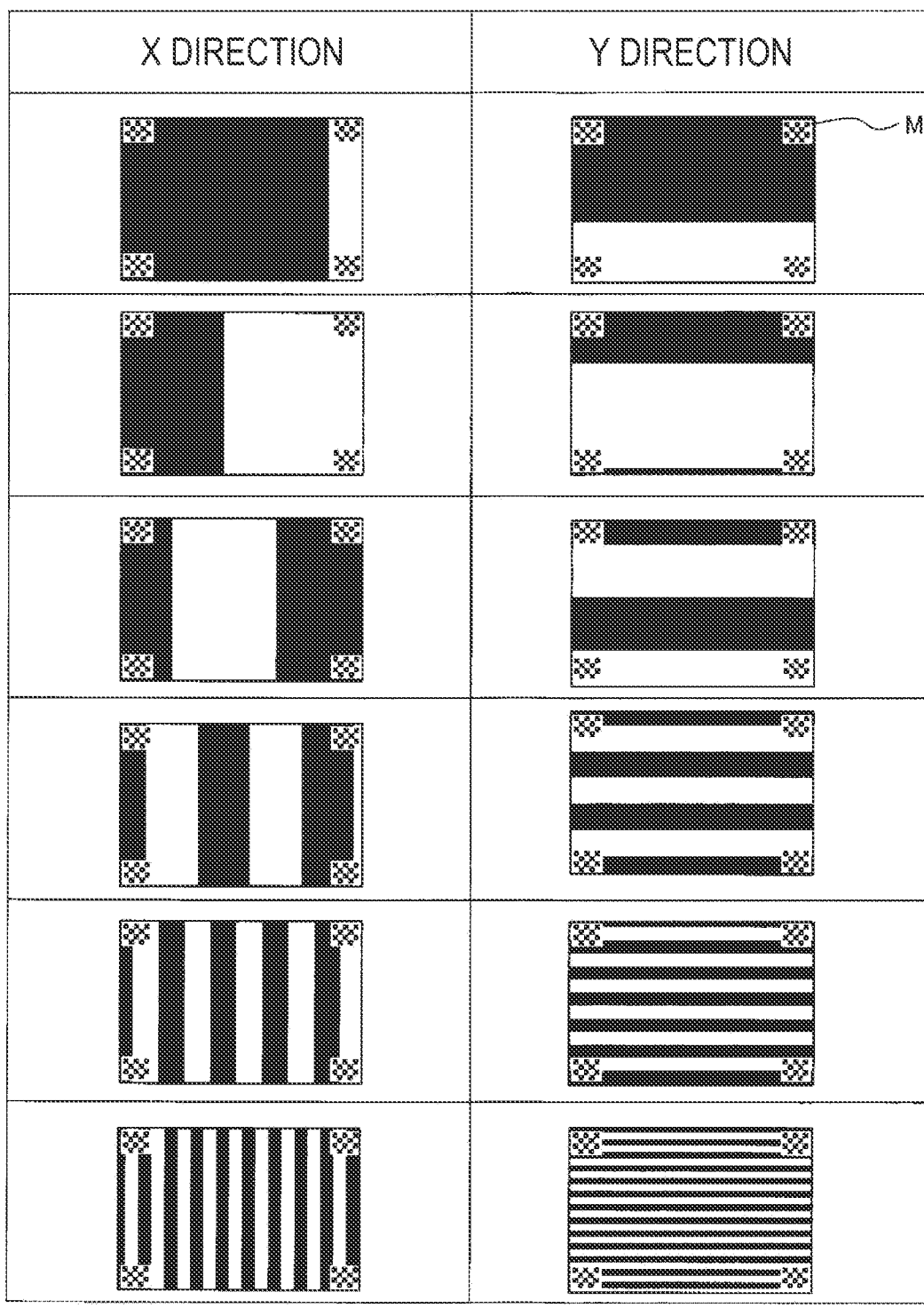
FIG. 5 is a diagram showing an example of a pattern image that the specifying device causes the projector to project.

In this embodiment, the binary code pattern is used as the measurement pattern. However, other structured light such as a dot pattern, a rectangular pattern, a polygonal pattern, a checker pattern, a gray code pattern, a phase shift pattern, or a random dot pattern may be used. As examples of the second measurement pattern in the case in which the gray code pattern is used as the measurement pattern and the numbers of pixels in the longitudinal direction and the lateral direction indicated by the resolution information are respectively represented binary numbers of six digits, there are twenty-four measurement patterns shown in FIG. 4. As examples of the first measurement pattern in this case, there are twelve measurement patterns shown in FIG. 5.

The processing device 40 operating according to the program PA executes a specifying method according to the present disclosure. FIG. 6 is a flowchart showing a flow of the specifying method. As shown in FIG. 6, the specifying method includes acquisition processing SA100, determination processing SA110, first imaging control processing SA120, first specifying processing SA130, second imaging control processing SA140, and second specifying processing SA150.

In the acquisition processing SA100, the processing device 40 functions as the acquiring section 400. In the acquisition processing SA100, the processing device 40 acquires projector information according to an instruction to start specifying the correspondence relation by operation on the touch panel 10. In the acquisition processing SA100, the processing device 40 acquires first acceleration data and second acceleration data.

In the determination processing SA110, the processing device 40 determines, based on the first acceleration data and the second acceleration data, whether the imaging device 50 is fixed. As explained above, in the determination processing SA110, first, the processing device 40 calculates an amount of change of speed of the imaging device 50 in the predetermined time from the first time to the second time. Specifically, the processing device 40 sets a sum of the magnitude of first acceleration indicated by the first acceleration data and the magnitude of second acceleration indicated by the second acceleration data as the amount of change of the speed of the imaging device 50 in the predetermined time from the first time to the second time. Subsequently, when the amount of change of the speed of the imaging device 50 is smaller than a predetermined threshold, the processing device 40 determines that the imaging device 50 is fixed. When the amount of change of the speed of the imaging device 50 is equal to or larger than the predetermined threshold, the processing device 40 determines that the imaging device 50 is not fixed.

When the amount of change of the speed of the imaging device 50 is smaller than the predetermined threshold, a determination result of the determination processing SA110 is "Yes". When the amount of change of the speed of the imaging device 50 is equal to or larger than the predetermined threshold, the determination result of the determination processing SA110 is "No". When the determination result of the determination processing SA110 is "No", that is, negative, the first imaging control processing SA120 and the first specifying processing SA130 are executed. When the determination result of the determination processing SA110 is "Yes", that is, affirmative, the second imaging control processing SA140 and the second specifying processing SA150 are executed.

In the first imaging control processing SA120, the processing device 40 functions as the first imaging control section 420. In the first imaging control processing SA120, the processing device 40 generates images of the first Group based on the projector information and controls the projector 2 to sequentially project the images of the first group. The processing device 40 urges the user to capture the images of the first group sequentially projected onto the projection object SC and causes the imaging device 50 to perform imaging according to operation by the user to generate a captured image.

In the first specifying processing SA130, the processing device 40 functions as the first specifying section 430. In the first specifying processing SA130, the processing device 40 specifies the correspondence relation between the projector coordinate system and the camera coordinate system based on the images of the first group and captured images of the projection object SC imaged in a state in which the images of the first group are projected. More specifically, in the first specifying processing SA130, the processing device 40 generates, from images of the plurality of first measurement patterns and the plurality of captured images, a transformation matrix for performing projective transformation from a coordinate of the first measurement pattern in the captured image captured by the imaging device 50 into a coordinate of the first measurement pattern in the display device of the projector 2.

In the second imaging control processing SA140, the processing device 40 functions as the second imaging control section 440. In the second imaging control processing SA140, the processing device 40 generates images of the second group based on the projector information and controls the projector 2 to sequentially project the mages of the second group. The processing device 40 urges the user to capture the images of the second group sequentially projected onto the projection object SC and causes the imaging device 50 to perform imaging according to operation by the user to generate a captured image.

In the second specifying processing SA150, the processing device 40 functions as the second specifying section 450. In the second specifying processing SA150, the processing device 40 specifies the correspondence relation between the projector coordinate system and the camera coordinate system based on the images of the second group and captured images of the projection object SC imaged in a state in which the images of the second group are projected. More specifically, in the second specifying processing SA150, the processing device 40 generates, from images of the plurality of second measurement patterns and a plurality of captured images, a transformation matrix for performing projective transformation from a coordinate of the second measurement pattern in a captured image captured by the imaging device 50 into a coordinate of the second measurement pattern in the display device of the projector 2.

With the specifying device 1A in this embodiment, when the imaging device 50 is fixed, the correspondence relation between the camera coordinate system and the projector coordinate system is specified using the images of the second group including the "positive pattern" and the "negative pattern". Therefore, the correspondence relation can be accurately specified. On the other hand, when the imaging device 50 is not fixed, the correspondence relation between the camera coordinate system and the projector coordinate system is specified using the images of the first group including one of the "positive pattern" and the "negative pattern". Since the number of images of the first group is smaller than the number of images of the second group, when the imaging device 50 is not fixed, the correspondence relation is specified in a shorter time compared with when the imaging device 50 is fixed. The influence due to a camera shake or the like can be reduced. The markers M for alignment are provided at the four corners of the images of the first group. The first specifying section 430 applies projective transformation to captured images captured by the imaging device 50 such that the sets of the four markers M in the captured images overlap one another and specifies the correspondence relation between the projector coordinate system and the camera coordinate system based on the images of the first group and the captured images subjected to the projective transformation. Therefore, the influence of the camera shake can be reduced.

2. Modifications

The embodiment may be changed as explained below.

(1) The sensor 60 in the embodiment is the sensor that detects the acceleration of the translational motion of the specifying device 1A. However, the sensor 60 may be a sensor that detects acceleration of a rotational motion around the center of gravity of the specifying device 1A, that is, angular acceleration. When the sensor 60 is the sensor that detects the angular acceleration, in the determination processing SA110, the processing device 40 may determine, based on an amount of change of angular velocity between the first time and the second time, whether the imaging device 50 is fixed. When determining, based on the amount of change of the angular velocity, whether the imaging device 50 is fixed, the processing device 40 only has to set a sum of angular acceleration at the first time and angular acceleration at the second time as the amount of change of the angular velocity.

(2) In the determination processing SA110 in the embodiment, the sum of the acceleration detected by the sensor 60 at the first time and the acceleration detected by the sensor 60 at the second time is set as the amount of change of the speed of the imaging device 50. However, the processing device 40 may calculate speed of the imaging device 50 at the first time and speed of the imaging device 50 at the second time based on an output of the sensor 60 and set a difference between the speed at the first time and the speed at the second time as the amount of change of the speed of the imaging device 50. The processing device 40 may set a sum of the speed of the imaging device 50 at the first time and the speed of the imaging device 50 at the second time as an amount of change of the position of the imaging device 50 and determine, based on the amount of change of the position of the imaging device 50, whether the imaging device 50 is fixed. Specifically, if the amount of change of the position of the imaging device 50 is smaller than a threshold, the processing device 40 only has to determine that the imaging device 50 is fixed. If the amount of change of the position of the imaging device 50 is equal to or larger than the threshold, the processing device 40 only has to determine that the imaging device 50 is not fixed. The processing device 40 may detect the speed of the imaging device 50 at the first time and the speed of the imaging device 50 at the second time using a speed sensor as the sensor 60.

(3) The processing device 40 may determine, based on not the amount of change of the speed or the position of the imaging device 50 but acceleration at each of first time, second time, third time, and fourth time, that is, a distribution of acceleration in a time section from the first time to the fourth time, whether the imaging device 50 is fixed. This is because, when the user holds the specifying device 1A by hand and performs imaging, a cycle due to a camera shake appears in the distribution of the acceleration of the imaging device 50. Specifically, the acquiring section 400 detects acceleration of the imaging device 50 at each of the first time, the second time, the third time, and the fourth time and converts a distribution of the acceleration of the imaging device 50 in a time domain from the first time to the fourth time into a spectrum in a frequency domain. When intensity at a peak of the spectrum is equal to or larger than a threshold, the determining section 410 determines that the imaging device 50 is not fixed. When the intensity at the peak of the spectrum is smaller than the threshold, the determining section 410 determines that the imaging device 50 is fixed.

(4) In the determination processing SA110, the processing device 40 may display, on the display device of the touch panel 10, a screen for urging the user to input information indicating whether the imaging device 50 is fixed and may determine, based on the information input by the user, whether the imaging device 50 is fixed. In this aspect, the sensor 60 and the acquisition processing SA100 are unnecessary.

(5) The acquiring section 400, the determining section 410, the first imaging control section 420, the first specifying section 430, the second imaging control section 440, and the second specifying section 450 in the embodiment are the software modules. However, a part or all of the acquiring section 400, the determining section 410, the first imaging control section 420, the first specifying section 430, the second imaging control section 440, and the second specifying section 450 may be hardware. Examples of the hardware include a DSP (Digital Signal Processor), an ASIC (Application Specific Integrated Circuit), a PLD (Programmable Logic Device), and an FPGA (Field Programmable Gate Array). Even if a part or all of the acquiring section 400, the determining section 410, the first imaging control section 420, the first specifying section 430, the second imaging control section 440, and the second specifying section 450 are hardware, the same effects as the effects in the embodiment are achieved.

(6) The specifying device 1A is the smartphone including the imaging device 50. However, the specifying device 1A may be a tablet terminal including an imaging device or a notebook personal computer including an imaging device. When the notebook personal computer is used as the specifying device according to the present disclosure, various kinds of operation may be received using a mouse or a keyboard as an input device. In a computer system including a portable terminal having an imaging function such as a smartphone or a tablet terminal a server device that communicates with the portable terminal via a LAN or the Internet, a processing device of the server device may be caused to function as the acquiring section 400, the determining section 410, the first imaging control section 420, the first specifying section 430, the second imaging control section 440, and the second specifying section 450 and the portable terminal may be caused to play a role of the imaging device and the input device. The computer system is an example of the specifying system according to the present disclosure.

(7) In the embodiment explained above, the program PA is stored in the storage device 30. However, the program PA may be manufactured or distributed alone. As a specific distribution method for the program PA, an aspect of writing the program PA in a computer-readable recording medium such as a flash ROM (Read Only Memory) and distributing the program PA or an aspect of distributing the program PA by downloading the program PA through an electric communication line such as the Internet is conceivable. By installing the program PA in a general information processing device such as a personal computer and causing a computer such as a CPU of the information processing device to operate according to the program PA, it is possible to cause the information processing device to function as the specifying device according to the present disclosure.

(8) The images of the first group generated by the first imaging control section 420 in the embodiment explained above including binary code pattern sections in which the binary code patterns are displayed and the four markers M may be formed by only an achromatic color as shown in FIG. 3 or may be formed to differentiate color tones of the binary code pattern sections and the four markers M. For example, the binary code pattern sections may be formed by a chromatic color such as red or green, and the four markers M may be formed by an achromatic color such as white or black. Alternatively, the binary code pattern sections may be formed by an achromatic color such as white or black, and the four markers M may be formed by a chromatic color such as red or green. By differentiating the color tones of the binary code pattern sections and the four markers B in this way, it is possible to more accurately detect the four markers M from the images of the first group and the captured images captured by the imaging device 50. The same applies when other structured light such as a dot pattern, a rectangular pattern, a polygonal pattern, a checker pattern, a gray code pattern, a phase shift pattern, or a random dot pattern other than the binary code pattern is used as the measurement pattern.

3. Aspects Grasped from at Least One of the Embodiment and the Modifications The present disclosure is not limited to the embodiment and the modifications explained above and can be realized in various aspects without departing from the gist of the present disclosure. For example, the present disclosure can also be realized by aspects described below. Technical features in the embodiment corresponding to technical features in the aspects described below can be substituted or combined as appropriate in order to solve a part or all of the problems of the present disclosure or attain a part or all of the effects of the present disclosure. Unless the technical features are explained in this specification as essential technical features, the technical features can be deleted as appropriate.

A specifying method of the present disclosure includes the determination processing SA110, the first imaging control processing SA120, the first specifying processing SA130, the second imaging control processing SA140, and the second specifying processing SA150. In the determination processing SA110, it is determined whether the imaging device 50 that images the projection object SC onto which a projection image is projected from the projector 2 is fixed. When a determination result of the determination processing SA110 is negative, that is, when it is determined that the imaging device 50 is not fixed, the first imaging control processing SA120 and the first specifying processing SA130 are executed. On the other hand, when the determination result of the determination processing SA110 affirmative, that is, when it is determined that the imaging device 50 is fixed, the second imaging control processing SA140 and the second specifying processing SA150 are executed. In the first imaging control processing SA120, the images belonging to the first group are sequentially projected onto the projection object SC from the projector 2. A captured image is generated by imaging the projection object SC with the imaging device 50 in a state in which the images belonging to the first group are projected. In the first specifying processing SA130, correspondence relation between a position on an image projected onto the projection object SC and a position on a capture image is specified based on the images of the first group projected onto the projection object SC from the projector 2 and the captured images by the imaging device 50. In the second imaging control processing SA140, the images belonging to the second group are sequentially projected onto the projection object SC from the projector 2. A captured image is generate by imaging the projection object SC with the imaging device 50 in a state in which the images belonging to the second group are projected. In the second specifying processing SA150, a correspondence relation between a position on an image projected onto the projection object SC and a position on a captured image is specified based on the images of the second group projected onto the projection object SC from the projector 2 and the captured images by the imaging device 50.

According to this aspect, the images of the different groups are used when the imaging device 50 is fixed and when the imaging device 50 is not fixed. Therefore, it is possible to accurately specify the correspondence relation between the projector coordinate system and the camera coordinate system irrespective of a fixing state of the imaging device 50. Specifically, the "positive pattern" and the "negative pattern" only have to be included in the images of the second group. One of the "positive pattern" and the "negative pattern" only has to be included in the images of the first group. The markers M for alignment may be provided at the four corners of the images of the first group. Note that the first imaging control processing SA120 and the second imaging control processing SA140 may be integrated into one imaging control processing. In the imaging control processing, when it is determined that the imaging device 50 is not fixed, the images belonging to the first group are sequentially projected onto the projection object SC from the projector 2 and, on the other hand, when it is determined that the imaging device 50 fixed, the images belonging to the second group are sequentially projected onto the projection object SC from the projector 2. In the imaging control processing, in a state in which the images belonging to the first group or the images belonging to the second group are projected, a captured image is generated by imaging the projection object SC with the imaging device 50. The first specifying processing SA130 and the second specifying processing SA150 may also be integrated into one specifying processing. In the specifying processing, based on an image projected onto the projection object SC from the projector 2 and a captured image by the imaging device 50, a corresponding relation between a position on the image projected onto the projection object SC and a position on the captured image is specified.

In a specifying method according to a more preferred aspect, in the determination processing SA110, it may be determined, based on an amount of change of the position of the imaging device 50 from the first time to the second time, whether the imaging device 50 is fixed. Specifically, when the amount of change of the position of the imaging device 50 from the first time to the second time is equal to or larger than a threshold, it is determined that the imaging device 50 is not fixed. When the amount of change is smaller than the threshold, it is determined that the imaging device 50 is fixed. According to this aspect, it is possible to determine, based on the amount of change of the position of the imaging device 50 from the first time to the second time, whether the imaging device 50 is fixed.

In a specifying method according to another preferred aspect, in the determination processing SA110, it may be determined, based on an amount of change of speed of the imaging device 50 from the first time to the second time, whether the imaging device 50 is fixed. Specifically, when the amount of change of the speed of the imaging device 50 from the first time to the second time is equal to or larger than a threshold, it is determined that the imaging device 50 is not fixed. When the amount of change is smaller than the threshold, it is determined that the imaging device 50 is fixed. According to this aspect, it is possible to determine, based on the amount of change of the speed of the imaging device 50 from the first time to the second time, whether the imaging device 50 is fixed.

In a specifying method according to another preferred aspect, in the determination processing SA110, first acceleration, which is acceleration of the imaging device 50 at the first time, and second acceleration, which is acceleration of the imaging device 50 at the second time, may be acquired. In this aspect, a sum of the first acceleration and the second acceleration is set as the amount of change of the speed of the imaging device 50. According to this aspect, it is possible to calculate the amount of change of the speed of the imaging device 50 from the first time to the second time based on the first acceleration and the second acceleration.

In a specifying method according to another preferred aspect, in the determination processing SA110, acceleration of the imaging device 50 at each of the first time, the second time, the third time, and the fourth time may be acquired. In the determination processing SA110, a distribution of acceleration of the imaging device 50 in a time domain from the first time to the fourth time is converted into a spectrum in a frequency domain. When intensity at a peak of the spectrum is equal to or larger than a threshold, it is determined that the imaging device 50 is not fixed. When the intensity at the peak of the spectrum is smaller than the threshold, it is determined that the imaging device 50 is fixed. According to this aspect, it is possible to determine, based on the distribution of the acceleration of the imaging device 50 in the time domain from the first time to the fourth time, whether the imaging device 50 is fixed.

In a specifying method according to another preferred aspect, in the determination processing SA110, the user is urged to input information indicating whether the imaging device 50 is fixed. It may be determined, based on the information input by the user, whether the imaging device 50 is fixed. According to this aspect, it is possible to cause the user to designate whether the imaging device 50 is fixed.

A specifying system according to the present disclosure includes the projector 2, the imaging device 50, and the processing device 40. The processing device 40 executes the determination processing SA110, the imaging control processing, and the specifying processing explained above. According to this aspect as well, it is possible to accurately specify the correspondence relation between the projector coordinate system and the camera coordinate system irrespective of a fixing state of the imaging device 50.

A program according to the present disclosure causes a computer to execute the determination processing SA110, the imagine control processing, and the specifying processing explained above. According to this aspect as well, it is possible to accurately specify the correspondence relation between the projector coordinate system and the camera coordinate system irrespective of a fixing state of the imaging device 50.

What is claimed is:

1. A specifying method comprising:
    determining whether an camera that images a projection object onto which a projection image is projected from a projector is fixed;
    sequentially projecting images belonging to a first group onto the projection object from the projector when determining that the camera is not fixed;
    sequentially projecting images belonging to a second group onto the projection object from the projector when determining that the camera is fixed;
    imaging the projection object with the camera to generate a captured image in a state in which the images belonging to the first group or the images belonging to the second group are projected; and
    specifying, based on an image projected onto the projection object from the projector and the captured image by the camera, a correspondence relation between a position on the image projected onto the projection object and a position on the captured image.

2. The specifying method according to claim 1, further comprising:
    detecting an amount of change of a position of the camera from first time to second time;
    determining that the camera is not fixed when the amount of change is equal to or larger than a threshold; and
    determining that the camera is fixed when the amount of change is smaller than the threshold.

3. The specifying method according to claim 1, further comprising:
    detecting an amount of change of speed of the camera from first time to second time;
    determining that the camera is not fixed when the amount of change is equal to or larger than a threshold; and
    determining that the camera is fixed when the amount of change is smaller than the threshold.

4. The specifying method according to claim 3, further comprising:
    detecting first acceleration, which is acceleration of the camera at the first time, and second acceleration, which is acceleration of the camera at the second time; and
    setting a sum of the first acceleration and the second acceleration as the amount of change of the speed of the camera.

5. The specifying method according to claim 1, further comprising:
    detecting acceleration of the camera in each of first time, second time, third time, and fourth time;
    determining that the camera is not fixed when intensity at a peak of a spectrum in a frequency domain, converted from a distribution of an acceleration of the camera in a time domain from the first time to the fourth time, is equal to or larger than a threshold; and
    determining that the camera is fixed when the intensity at the peak of the spectrum is smaller than the threshold.

6. The specifying method according to claim 1, further comprising
    determining, based on an information indicating whether the camera is fixed input by a user, whether the camera is fixed.

7. The specifying method according to claim 1, wherein a number of images of the first group is smaller than a number of images of the second group.

8. The specifying method according to claim 1, wherein the images of the first group are the images of patterns different from one another, and the images of the first group are the images obtained by adding markers for positioning of the patterns to the images of the patterns different from one another.

9. A specifying system comprising:
    a projector;
    a camera; and at least one processor executes:
  determining whether the camera is fixed;
  causing the projector to sequentially project images belonging to a first group onto a projection object when determining that the camera is not fixed;
  causing the projector to sequentially project images belonging to a second group onto the projection object when determining that the camera is fixed;
  causing the camera to image the projection object to generate a captured image in a state in which the images belonging to the first group or the images belonging to the second group are projected; and
  specifying, based on an image projected onto the projection object from the projector and the captured image by the camera, a correspondence relation between a position on the image projected onto the projection object and a position on the captured image.

10. A non-transitory computer-readable storage medium storing a program, the program causing a computer to execute:
  determining whether a camera that images a projection object onto which a projection image is projected from a projector is fixed;
  causing the projector to sequentially project images belonging to a first group onto the projection object when determining that the camera is not fixed;
  causing the projector to sequentially project images belonging to a second group onto the projection object when determining that the camera is fixed;
  causing the camera to image the projection object to generate a captured image in a state in which the images belonging to the first group or the images belonging to the second group are projected; and
  specifying, based on an image projected on the projection object from the projector and the captured image by the camera, a correspondence relation between a position on the image projected onto the projection object and a position on the captured image.

* * * * *